United States Patent
Horiuchi et al.

(10) Patent No.: US 12,280,799 B2
(45) Date of Patent: Apr. 22, 2025

(54) TRAVEL CONTROLLER AND METHOD FOR TRAVEL CONTROL

(71) Applicants: TOYOTA JIDOSHA KABUSHIKI KAISHA, Toyota (JP); AISIN CORPORATION, Aichi-ken (JP)

(72) Inventors: Yuki Horiuchi, Tokyo-to (JP); Taku Mitsumori, Kariya (JP); Yuji Yamanishi, Tokyo-to (JP); Yuki Takeda, Kariya (JP); Masahiro Ishihara, Tokyo-to (JP)

(73) Assignees: TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 242 days.

(21) Appl. No.: 18/086,988

(22) Filed: Dec. 22, 2022

(65) Prior Publication Data

US 2023/0202520 A1    Jun. 29, 2023

(30) Foreign Application Priority Data

Dec. 27, 2021    (JP) ................................ 2021-213390

(51) Int. Cl.
*B60W 60/00* (2020.01)
*G06T 7/50* (2017.01)
(Continued)

(52) U.S. Cl.
CPC .... *B60W 60/0013* (2020.02); *B60W 60/0015* (2020.02); *G06T 7/50* (2017.01);
(Continued)

(58) Field of Classification Search
CPC ......... B60W 60/0013; B60W 60/0015; B60W 2420/403; B60W 2540/225;
(Continued)

(56) References Cited

U.S. PATENT DOCUMENTS

| 2009/0022368 | A1* | 1/2009 | Matsuoka | .............. B60K 35/00 382/103 |
| 2017/0225677 | A1 | 8/2017 | Yoshida et al. | |

(Continued)

FOREIGN PATENT DOCUMENTS

| JP | 2016-052881 A | 4/2016 |
| JP | 2018-101400 A | 6/2018 |

(Continued)

*Primary Examiner* — Sahar Motazedi
(74) *Attorney, Agent, or Firm* — Oliff PLC

(57) ABSTRACT

A travel controller detects objects from an environmental image representing surroundings of a vehicle capable of traveling under autonomous driving control satisfying a predetermined safety standard; detects a looking direction of a driver of the vehicle from a face image of the driver; identifies an object in the looking direction of the driver out of the objects; stores the identified object and a situation condition indicating the situation at detection of the identified object in a memory in association with each other when a danger avoidance action performed by the driver is detected during travel of the vehicle; and changes the predetermined safety standard so that the driver can feel safer, in the case where an object stored in the memory is detected during travel of the vehicle under the autonomous driving control and where the situation at detection of the object satisfies the situation condition.

7 Claims, 7 Drawing Sheets

| TIME | OBJECT | SITUATION CONDITION | | DANGER AVOIDANCE ACTION |
|---|---|---|---|---|
| | | TYPE | VALUE | |
| T1 | PEDESTRIAN | LENGTHWISE DISTANCE | 20 | YES |
| T1 | PEDESTRIAN | LATERAL DISTANCE | 4 | YES |
| T1 | PEDESTRIAN | WHETHER OBJECT IS FACING VEHICLE | Y | YES |
| T2 | PEDESTRIAN | LENGTHWISE DISTANCE | 20 | NO |
| T2 | PEDESTRIAN | LATERAL DISTANCE | 4 | NO |
| T2 | PEDESTRIAN | WHETHER OBJECT IS FACING VEHICLE | N | NO |
| T3 | VEHICLE | LENGTHWISE DISTANCE | 40 | YES |
| T3 | VEHICLE | LATERAL DISTANCE | 1 | YES |
| T3 | VEHICLE | THE NUMBER OF LANES | 2 | YES |
| T3 | VEHICLE | VEHICLE SPEED | 30 | YES |
| T4 | PEDESTRIAN | LENGTHWISE DISTANCE | 30 | NO |
| T4 | PEDESTRIAN | LATERAL DISTANCE | 5 | NO |
| T4 | PEDESTRIAN | WHETHER OBJECT IS FACING VEHICLE | Y | NO |
| T5 | PEDESTRIAN | LENGTHWISE DISTANCE | 15 | YES |
| T5 | PEDESTRIAN | LATERAL DISTANCE | 5 | YES |
| T5 | PEDESTRIAN | WHETHER OBJECT IS FACING VEHICLE | Y | YES |
| ... | ... | ... | ... | ... |

421

(51) Int. Cl.
*G06T 7/70* (2017.01)
*G06V 20/58* (2022.01)

(52) U.S. Cl.
CPC ........... *G06T 7/70* (2017.01); *G06V 20/58* (2022.01); *B60W 2420/403* (2013.01); *B60W 2540/225* (2020.02); *G06T 2207/20081* (2013.01); *G06T 2207/30201* (2013.01); *G06T 2207/30268* (2013.01)

(58) Field of Classification Search
CPC ...... B60W 2554/40; B60W 2554/4029; G06T 7/50; G06T 7/70; G06T 2207/20081; G06T 2207/30201; G06T 2207/30268; G06V 20/58; G06V 10/82; G06V 20/597
See application file for complete search history.

(56) References Cited

U.S. PATENT DOCUMENTS

| | | | |
|---|---|---|---|
| 2018/0050702 A1* | 2/2018 | Tanimichi | B60W 40/09 |
| 2018/0170392 A1 | 6/2018 | Yang et al. | |
| 2018/0259956 A1* | 9/2018 | Kawamoto | B60W 60/0053 |
| 2019/0072961 A1 | 3/2019 | Xavier | |
| 2020/0371518 A1* | 11/2020 | Kang | B60W 60/001 |
| 2023/0080716 A1* | 3/2023 | Markofsky | B60W 50/082 701/23 |

FOREIGN PATENT DOCUMENTS

| | | |
|---|---|---|
| JP | 2019-43496 A | 3/2019 |
| JP | 2019-172137 A | 10/2019 |

* cited by examiner

| TIME | OBJECT | SITUATION CONDITION | | DANGER AVOIDANCE ACTION |
|---|---|---|---|---|
| | | TYPE | VALUE | |
| T1 | PEDESTRIAN | LENGTHWISE DISTANCE | 20 | YES |
| T1 | PEDESTRIAN | LATERAL DISTANCE | 4 | YES |
| T1 | PEDESTRIAN | WHETHER OBJECT IS FACING VEHICLE | Y | YES |
| T2 | PEDESTRIAN | LENGTHWISE DISTANCE | 20 | NO |
| T2 | PEDESTRIAN | LATERAL DISTANCE | 4 | NO |
| T2 | PEDESTRIAN | WHETHER OBJECT IS FACING VEHICLE | N | NO |
| T3 | VEHICLE | LENGTHWISE DISTANCE | 40 | YES |
| T3 | VEHICLE | LATERAL DISTANCE | 1 | YES |
| T3 | VEHICLE | THE NUMBER OF LANES | 2 | YES |
| T3 | VEHICLE | VEHICLE SPEED | 30 | YES |
| T4 | PEDESTRIAN | LENGTHWISE DISTANCE | 30 | NO |
| T4 | PEDESTRIAN | LATERAL DISTANCE | 5 | NO |
| T4 | PEDESTRIAN | WHETHER OBJECT IS FACING VEHICLE | Y | NO |
| T5 | PEDESTRIAN | LENGTHWISE DISTANCE | 15 | YES |
| T5 | PEDESTRIAN | LATERAL DISTANCE | 5 | YES |
| T5 | PEDESTRIAN | WHETHER OBJECT IS FACING VEHICLE | Y | YES |
| ... | ... | ... | ... | ... |

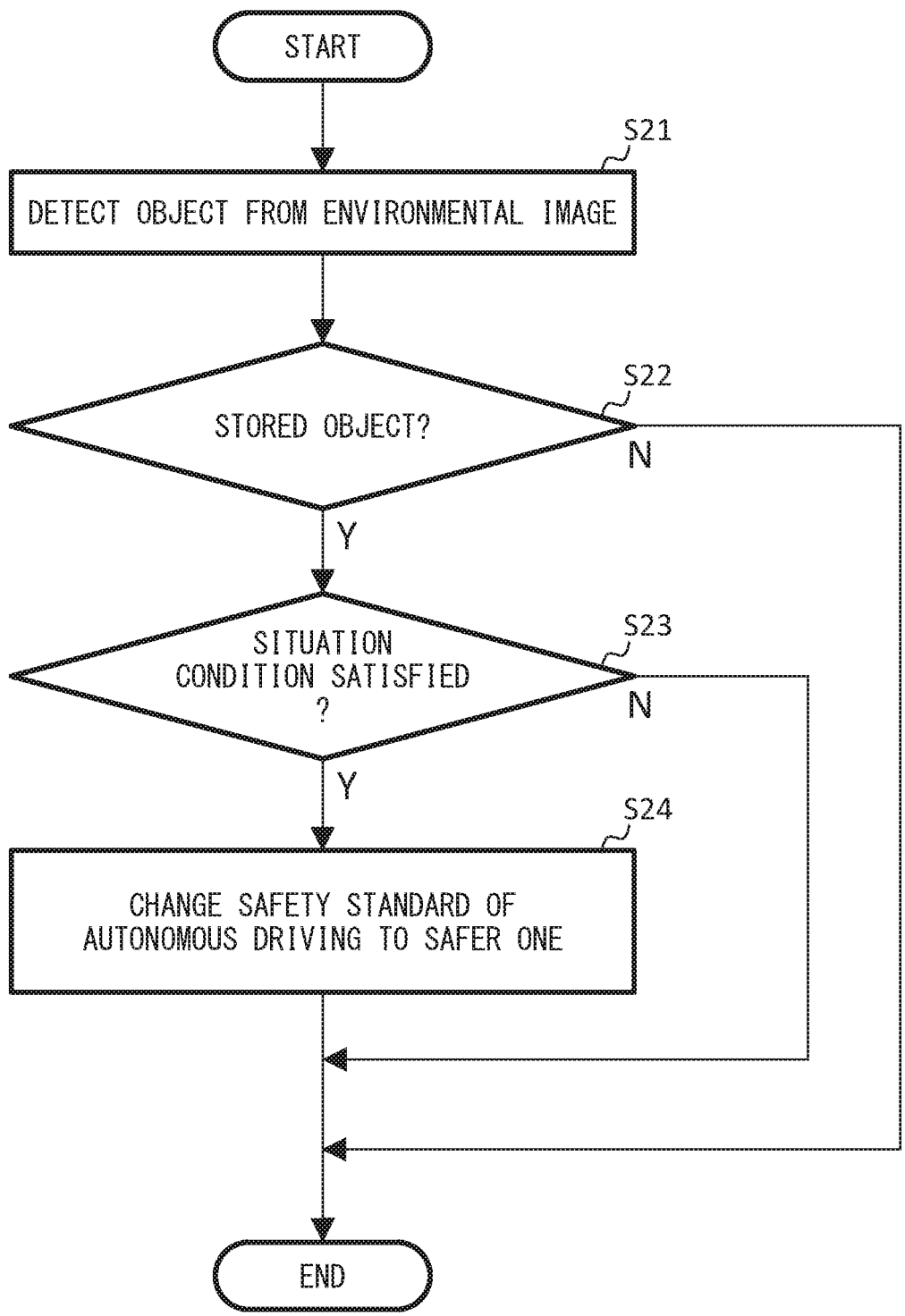

TRAVEL CONTROLLER AND METHOD FOR TRAVEL CONTROL

FIELD

The present disclosure relates to a controller and a method for automatically controlling travel of a vehicle.

BACKGROUND

A travel controller that automatically controls travel of a vehicle on the basis of environmental images generated by a camera mounted on the vehicle is known. The travel controller detects an object in an area around the vehicle from an environmental image, and controls travel of the vehicle so as to avoid collision with the object.

A data processing system described in Japanese Unexamined Patent Publication No. 2018-101400 (hereafter "Patent Literature 1") determines a user's driving behavior and preference, based on driving statistics collected while an autonomous vehicle is driven in manual driving mode, and generates the user's driving profile, based on the user's driving behavior and preference. The driving profile generated by the technique of Patent Literature 1 in a driving scenario, such as route selection and a lane change, is used for travel control of the autonomous vehicle in a similar driving scenario.

SUMMARY

Even if a tendency for a driver to perform predetermined driving behavior in a certain driving scenario is recognized, it is not necessarily clear whether the driver paid attention to the driving scenario to perform the driving behavior. For example, in the case where driving slowly at an intersection without traffic signals is recognized as driving behavior, the driver may drive slowly, paying attention to a pedestrian near an intersection rather than the intersection itself. In such a case, driving without slowing down, for example, when passing a place other than an intersection, where a pedestrian is about to cross the road may make the driver feel uneasy, and thus is not necessarily appropriate travel control.

It is an object of the present disclosure to provide a travel controller that can control travel of a vehicle so that its driver does not feel uneasy.

A travel controller according to the present disclosure includes a processor configured to detect one or more objects from an environmental image representing surroundings of a vehicle capable of traveling under autonomous driving control satisfying a predetermined safety standard; detect a looking direction of a driver of the vehicle from a face image representing a face region of the driver; and identify an object in the looking direction of the driver out of the one or more objects. The processor of the travel controller is further configured to store the identified object and a situation condition indicating the situation at detection of the identified object in a memory in association with each other when a danger avoidance action performed by the driver to avoid danger is detected during travel of the vehicle; and change the predetermined safety standard so that the driver can feel safer, in the case where an object stored in the memory is detected during travel of the vehicle under the autonomous driving control and where the situation at detection of the object satisfies the situation condition.

In the travel controller according to the present disclosure, the situation condition preferably includes at least the distance from the vehicle to the identified object.

The processor of the travel controller according to the present disclosure is preferably further configured to make a learned situation condition, based on a plurality of situation conditions stored at different times in association with an object stored in the memory. The learned situation condition indicates a situation in which the danger avoidance action is detected at detection of the object. The processor of the travel controller, at changing the safety standard, preferably determines that the situation at detection of the object satisfies the situation condition, when the situation at detection of the object satisfies the learned situation condition.

In the travel controller according to the present disclosure, the processor of the travel controller, at storing the object and the situation, preferably further stores a rate at which the danger avoidance action is detected in the case that the situation at detection of the object during travel of the vehicle satisfies the situation condition. The processor of the travel controller, at making the learned situation condition, preferably makes the learned situation condition so that the situation condition corresponding to a higher rate of detection of the danger avoidance action has priority over the situation condition corresponding to a lower rate of detection of the danger avoidance action.

A method for travel control according to the present disclosure includes detecting one or more objects from an environmental image representing surroundings of a vehicle capable of traveling under autonomous driving control satisfying a predetermined safety standard; detecting a looking direction of a driver of the vehicle from a face image representing a face region of the driver; and identifying an object in the looking direction of the driver out of the one or more objects. The method further includes storing the identified object and a situation condition indicating the situation at detection of the identified object in a memory in association with each other when a danger avoidance action performed by the driver to avoid danger is detected during travel of the vehicle; and changing the predetermined safety standard so that the driver can feel safer, in the case where an object stored in the memory is detected during travel of the vehicle under the autonomous driving control and where the situation at detection of the object satisfies the situation condition.

The travel controller according to the present disclosure can control travel of a vehicle so that its driver does not feel uneasy.

BRIEF DESCRIPTION OF DRAWINGS

FIG. 5 illustrates an example of a situation table.

FIG. 7 is a flowchart of a second travel control process.

DESCRIPTION OF EMBODIMENTS

A travel controller that can control travel of a vehicle so that its driver does not feel uneasy will now be described in detail with reference to the attached drawings. The travel controller detects one or more objects from an environmental image representing surroundings of a vehicle capable of traveling under autonomous driving control satisfying a predetermined safety standard regarding, for example, the vehicle speed and the distance to an object in a surrounding area, and detects a looking direction of a driver of the vehicle from a face image representing a face region of the driver. The travel controller identifies an object in the looking direction of the driver out of the one or more objects. Thereafter, the travel controller stores the identified object and a situation condition indicating the situation at detection of the identified object in a memory in association with each other when a danger avoidance action performed by the driver to avoid danger is detected during travel of the vehicle. The travel controller then changes the predetermined safety standard so that the driver can feel safer, in the case where an object stored in the memory is detected during travel of the vehicle under the autonomous driving control and where the situation at detection of the object satisfies the situation condition.

Figure 1:
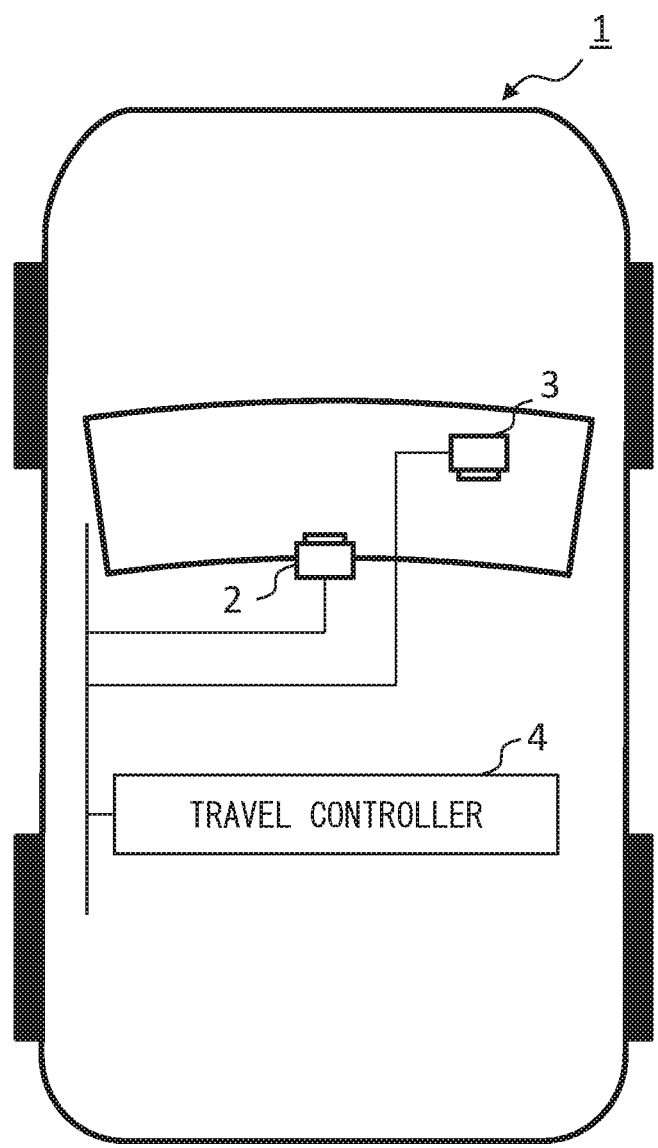
FIG. 1 schematically illustrates the configuration of a host vehicle equipped with a travel controller.

FIG. 1 schematically illustrates the configuration of a host vehicle equipped with the travel controller.

The vehicle 1 includes an environmental camera 2, a driver monitoring camera 3, and a travel controller 4. The environmental camera 2 and the driver monitoring camera 3 are communicably connected to the travel controller 4 via an in-vehicle network conforming to a standard such as a controller area network.

The environmental camera 2 is an example of an environmental image capturing unit for generating an environmental image representing the surroundings of the vehicle. The environmental camera 2 includes a two-dimensional detector constructed from an array of optoelectronic transducers, such as CCD or C-MOS, having sensitivity to visible light and a focusing optical system that forms an image of a target region on the two-dimensional detector. The environmental camera 2 is disposed, for example, in a front and upper area in the interior of the vehicle and oriented forward, takes a picture of the surroundings of the vehicle 1 through a windshield every predetermined capturing period (e.g., 1/30 to 1/10 seconds), and outputs environmental images representing the surroundings.

The driver monitoring camera 3 is an example of a driver image capturing unit for generating a face image representing a face region of the vehicle driver. The driver monitoring camera 3 includes a two-dimensional detector constructed from an array of optoelectronic transducers, such as CCD or C-MOS, having sensitivity to infrared light, a focusing optical system that forms an image of a target region on the two-dimensional detector, and a light source that emits infrared light. The driver monitoring camera 3 is mounted, for example, in a front area in the interior of the vehicle and oriented toward the face of the driver sitting on the driver's seat. The driver monitoring camera 3 irradiates the driver with infrared light every predetermined capturing period (e.g., 1/30 to 1/10 seconds), and outputs images representing the driver's face.

The travel controller 4 is an electronic control unit (ECU) including a communication interface, a memory, and a processor. The travel controller 4 outputs control signals to a travel mechanism (not shown) of the vehicle 1, including an engine, brakes, and steering, so as to satisfy a predetermined safety standard, and thereby executes autonomous driving control of the vehicle 1. In addition, the travel controller 4 detects an object in the driver's looking direction, based on an environmental image and a face image respectively received from the environmental camera 2 and the driver monitoring camera 3 via the communication interface, and stores the situation at detection of the object. The travel controller 4 then changes the safety standard of autonomous driving control of the vehicle 1, based on the situation at detection of an object from an environmental image.

Figure 2:
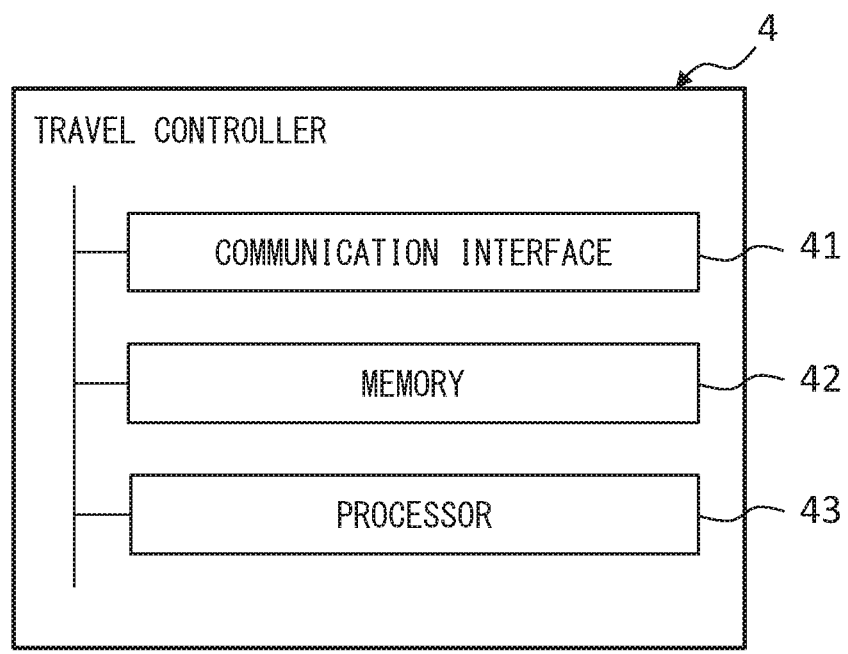
FIG. 2 schematically illustrates the hardware of the travel controller.

FIG. 2 schematically illustrates the hardware of the travel controller 4. The travel controller 4 includes a communication interface 41, a memory 42, and a processor 43.

The communication interface 41 is an example of a communication unit, and includes a communication interface circuit for connecting the travel controller 4 to the in-vehicle network. The communication interface 41 provides received data for the processor 43, and outputs data provided from the processor 43 to an external device.

The memory 42 is an example of a storage unit, and includes volatile and nonvolatile semiconductor memories. The memory 42 stores various types of data used for processing by the processor 43, such as a set of parameters for defining a neural network that functions as an object classifier for detecting an object from an environmental image, safety standards used for autonomous driving control, and a situation table in which detected objects and the situations at detection of the respective objects are associated with each other. The memory 42 also stores various application programs, such as a travel control program for executing a travel control process.

The processor 43, which is an example of a control unit, includes one or more processors and a peripheral circuit thereof. The processor 43 may further include another operating circuit, such as a logic-arithmetic unit, an arithmetic unit, or a graphics processing unit.

Figure 3:
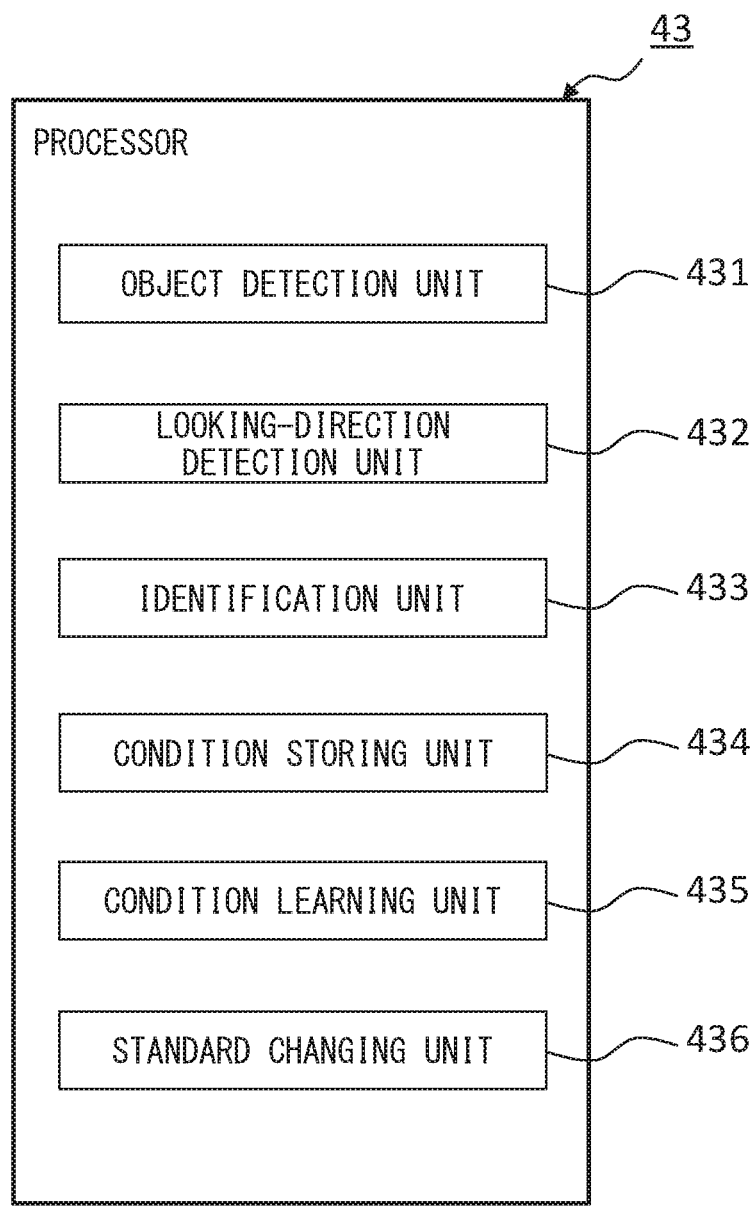
FIG. 3 is a functional block diagram of a processor included in the travel controller.

FIG. 3 is a functional block diagram of the processor 43 included in the travel controller 4.

As its functional blocks, the processor 43 of the travel controller 4 includes an object detection unit 431, a looking-direction detection unit 432, an identification unit 433, a condition storing unit 434, a condition learning unit 435, and a standard changing unit 436. These units included in the processor 43 are functional modules implemented by a program executed by the processor 43, or may be implemented in the travel controller 4 as separate integrated circuits, microprocessors, or firmware.

The object detection unit 431 detects an object in an area around the vehicle 1 by inputting an environmental image received from the environmental camera 2 via the communication interface into an object classifier that has been trained to detect an object.

The object classifier may be, for example, a convolutional neural network (CNN) including convolution layers connected in series from the input toward the output. A CNN that has been trained using inputted images including objects as training data operates as an object classifier that detects an object from an image.

The looking-direction detection unit 432 detects the driver's looking direction from a face image received from the driver monitoring camera 3 via the communication interface. The looking direction is expressed as a horizontal angle between the travel direction of the vehicle 1 and the direction in which the driver is looking.

The looking-direction detection unit 432 detects the positions of pupils and corneal reflections in the driver's eyes included in the face image by inputting the face image into a looking-direction classifier that has been trained to detect the positions of pupils and corneal reflections of a light source. The looking-direction detection unit 432 then detects the looking direction, based on the positional relationship between the pupils and the corneal reflections.

The looking-direction classifier may be, for example, a convolutional neural network (CNN) including convolution layers connected in series from the input toward the output. A CNN that has been trained using inputted face images including pupils and corneal reflections as training data operates as a looking-direction classifier that identifies the positions of pupils and corneal reflections.

The identification unit 433 identifies an object in the driver's looking direction out of the one or more objects detected from the environmental image.

Figure 4:
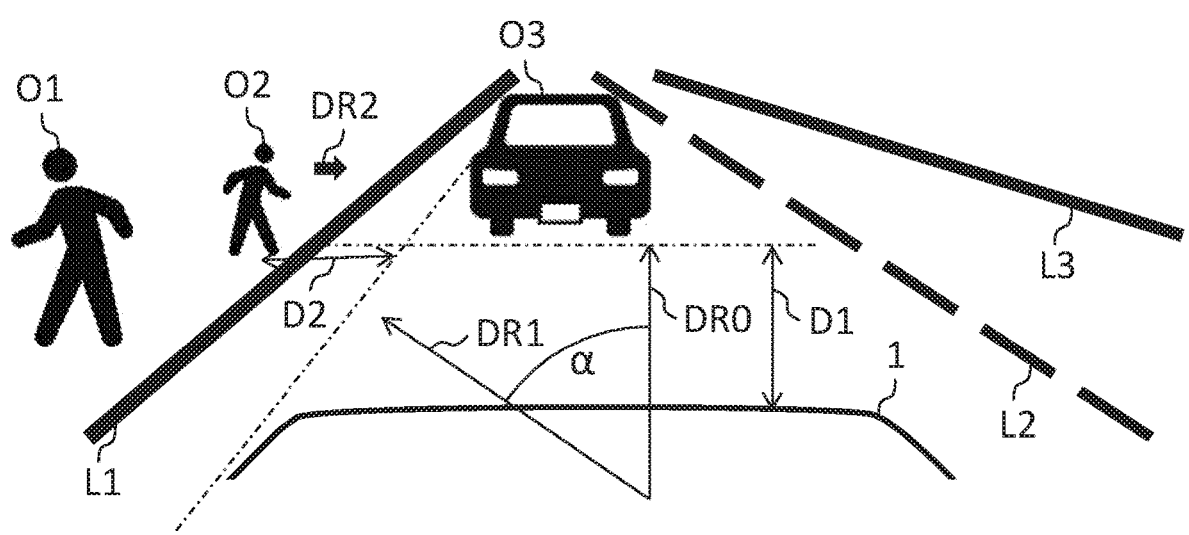
FIG. 4 is a diagram for explaining identification of an object in a looking direction.

FIG. 4 is a diagram for explaining identification of an object in a looking direction.

In the example of FIG. 4, objects O1 (pedestrian), O2 (pedestrian), and O3 (another vehicle) and lane-dividing lines L1, L2, and L3 are detected from an environmental image representing an area in front of the vehicle 1. In addition, a looking direction DR1 is detected from a face image. The looking direction DR1 is a direction forming an angle α with respect to a travel direction DR0. The identification unit 433 identifies the object O2 (pedestrian) at a position corresponding to the looking direction DR1 from the position of the vehicle 1 as an object in the driver's looking direction.

The condition storing unit 434 stores a situation condition indicating the situation at detection of an object identified by the identification unit 433 in the memory 42 in association with the identified object when the driver's danger avoidance action is detected during travel of the vehicle 1.

The danger avoidance action refers to an action performed on the vehicle 1 by the driver to avoid danger. The danger avoidance action may be, for example, an action performed by the driver during travel of the vehicle 1 under manual driving control, such as pressing down the brake pedal to decelerate or stop, or rotating the steering wheel to avoid approaching an object. Alternatively, the danger avoidance action may be, for example, an action performed by the driver during travel of the vehicle 1 under autonomous driving control, such as pressing down the brake pedal or rotating the steering wheel to indicate the intention to avoid danger, or pushing down a button so as to indicate such intention. The condition storing unit 434 detects a danger avoidance action by receiving an operation signal via the communication interface 41 from an operation unit connected to the in-vehicle network, such as the brake pedal, the steering wheel, or the button to indicate the intention to avoid danger.

The situation condition includes at least the distance from the vehicle to the object, e.g., the distance in the travel direction (lengthwise distance) or the distance in the lateral direction (lateral distance) from the vehicle to the object. The situation condition may include the orientation of the object, road environment (e.g., the presence or absence of a step between a sidewalk and a traffic lane, and the number of lanes), the speed and the acceleration of the vehicle, and the time required for the vehicle to reach the object.

In the example of FIG. 4, the condition storing unit 434 stores the lengthwise distance D1 and the lateral distance D2 to the identified object O2 (pedestrian) and information indicating whether the direction DR2 in which the object O2 (pedestrian) is facing is the direction to the host vehicle in the memory 42 in association with the object O2 (pedestrian).

FIG. 5 illustrates an example of the situation table.

In the situation table 421, detected objects and the situations at detection of the respective objects are stored in association with each other. For example, at time T1, a pedestrian is detected in the driver's looking direction; the driver's danger avoidance action is detected; and the values indicating the lengthwise distance, the lateral distance, and whether the object is facing the host vehicle, which are the situation condition at this time, are stored. At time T2 different from time T1, a pedestrian is detected in the driver's looking direction; the lengthwise distance at this time satisfies the situation condition of the lengthwise distance at time T1; and the values indicating the lengthwise distance, the lateral distance, and whether the object is facing the host vehicle, which are the situation condition at this time, are stored. At time T3, a vehicle is detected in the driver's looking direction; and the values indicating the lengthwise distance, the lateral distance, the number of lanes of the road being traveled, and the speed of the vehicle 1, which are the situation condition at this time, are stored.

The situation table 421 only has to associate objects with situations, and the invention is not limited to data management in the form of a table such as illustrated in FIG. 5.

The condition learning unit 435 makes a learned situation condition, based on a plurality of situation conditions stored at different times in association with an object stored in the memory 42. The learned situation condition indicates a situation in which a danger avoidance action is detected at detection of the object.

To this end, the condition learning unit 435 preferably makes a learned situation condition so that a situation condition corresponding to a higher rate of detection of a danger avoidance action has priority over a situation condition corresponding to a lower rate of detection of a danger avoidance action.

In the example of the situation table 421 illustrated in FIG. 5, of times T1, T4, and T5 at which whether the pedestrian is facing the host vehicle is YES, a danger avoidance action is detected at times T1 and T5 and not detected at time T4 (the rate of detection is 67%). When whether the pedestrian is facing the host vehicle is NO (at time T2), no danger avoidance action is detected (the rate of detection is 0%). Thus, regarding whether a pedestrian detected as an object is facing the host vehicle, the condition learning unit 435 makes a learned situation condition so that the situation condition, YES, corresponding to a higher rate of detection of a danger avoidance action has priority over the situation condition, NO, corresponding to a lower rate of detection of a danger avoidance action.

In the example of the situation table 421, of times T1 and T2 at which the lengthwise distance to the pedestrian is 20 (m), a danger avoidance action is detected at time T1 and not detected at time T2 (the rate of detection is 50%). At time T4 at which the lengthwise distance to the pedestrian is 30 (m), no danger avoidance action is detected (the rate of detection is 0%). At time T5 at which the lengthwise distance to the pedestrian is 15 (m), a danger avoidance action is detected (the rate of detection is 100%). Thus, regarding the lengthwise distance to a pedestrian, the condition learning unit 435 makes a learned situation condition so that a situation condition (e.g., 15 (m)) corresponding to a higher rate of detection of a danger avoidance action has priority over a situation condition (e.g., 30 (m)) corresponding to a lower rate of detection of a danger avoidance action. The learned situation condition is made as a conditional expression such as "the lengthwise distance to a pedestrian is not greater than 20 (m)."

The condition learning unit 435 may make a learned situation condition by training a classifier that classifies the situations at detection of the objects stored in the situation table 421 according to whether the driver's danger avoidance action is detected.

The classifier may be a support vector machine (SVM). The condition learning unit 435 inputs the objects and the situation conditions stored in the memory 42 in association with each other into a SVM to train it, thereby making a learned situation condition.

Alternatively, the classifier may be a neural network. The condition learning unit 435 inputs the objects and the situation conditions stored in the memory 42 in association with each other into a neural network to train it, thereby making a learned situation condition.

The standard changing unit 436 changes the predetermined safety standard so that the driver can feel safer, in the case that an object stored in the memory 42 is detected during travel of the vehicle 1 under the autonomous driving control and that the situation at detection of the object satisfies the situation condition.

For example, in the case that a pedestrian is detected during travel of the vehicle 1 under the autonomous driving control and that the lengthwise distance to the pedestrian is 20 (m), the lateral distance thereto is 4 (m), and whether the pedestrian is facing the host vehicle is YES, the situation at detection of the object satisfies the situation condition at time T1 at which a danger avoidance action is detected. The standard changing unit 436 then changes the predetermined safety standard so that the driver can feel safer.

When the safety standard is the vehicle speed, the standard changing unit 436 lowers the vehicle speed in order that the driver can feel safer. When the safety standard is the distance to an object in a surrounding area, the standard changing unit 436 lengthens the distance in order that the driver can feel safer.

When the situation at detection of an object satisfies a learned situation condition made by the condition learning unit 435, the standard changing unit 436 determines that the situation at detection of the object satisfies the situation condition. For example, assume that a learned situation condition "the lengthwise distance to a pedestrian is not greater than 20 (m), the lateral distance to the pedestrian is not greater than 4 (m), and whether the pedestrian is facing the host vehicle is YES" is made. When the lengthwise distance to a detected pedestrian is 18 (m), the lateral distance to the pedestrian is 3.5 (m), and whether the pedestrian is facing the host vehicle is YES, the situation at detection of the object satisfies the learned situation condition; thus, the standard changing unit 436 may determine that the situation at detection of the object satisfies the situation condition.

Figure 6:
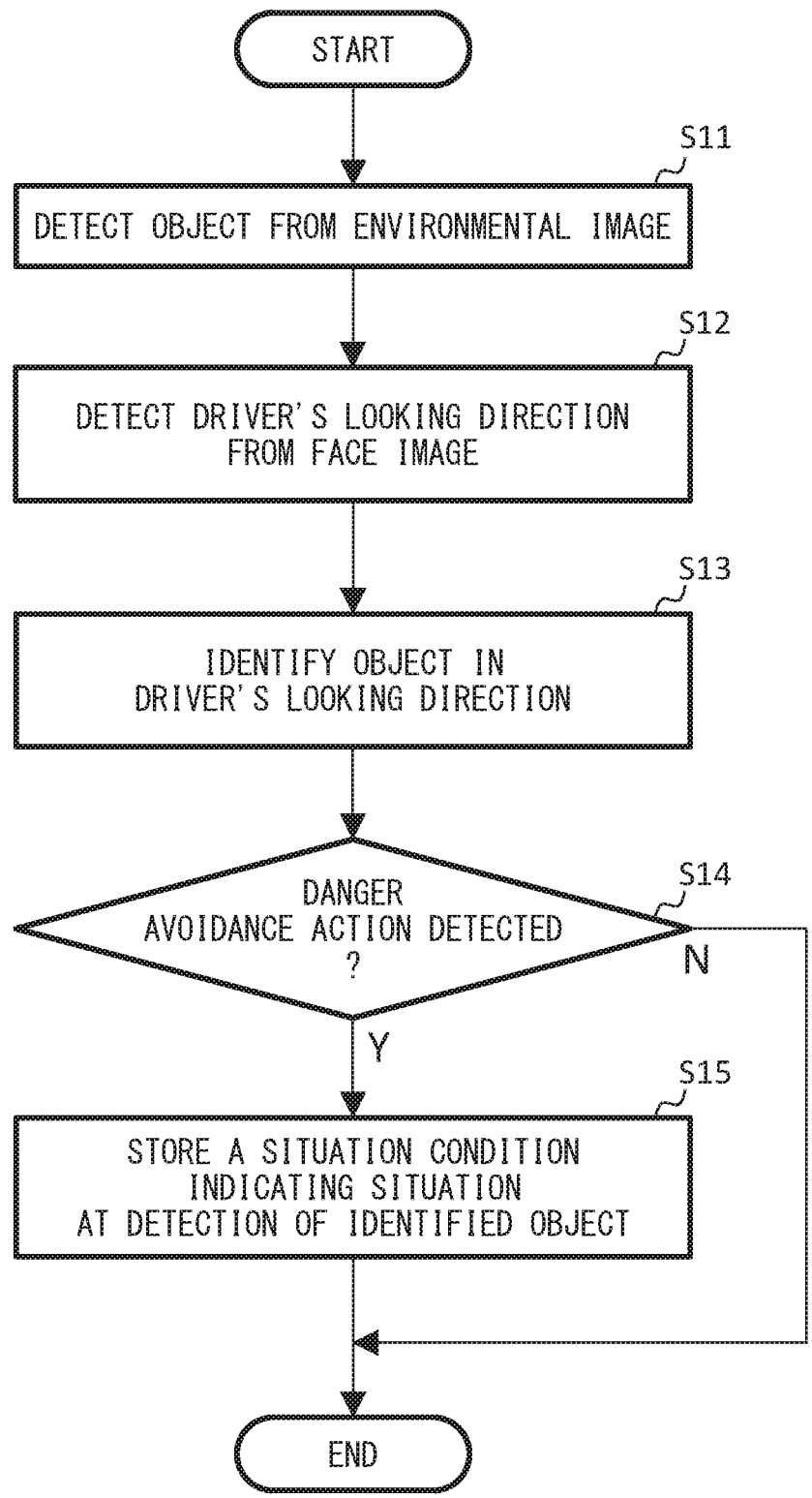
FIG. 6 is a flowchart of a first travel control process.

FIG. 6 is a flowchart of a first travel control process. The travel controller 4 repeatedly executes the first travel control process at predetermined intervals (e.g., intervals of ¹⁄₁₀ seconds) during travel of the vehicle 1.

First, the object detection unit 431 of the travel controller 4 detects one or more objects from an environmental image generated by the environmental camera 2 (step S11). The looking-direction detection unit 432 of the travel controller 4 detects the looking direction of the driver of the vehicle 1 from a face image generated by the driver monitoring camera 3 (step S12).

The identification unit 433 of the travel controller 4 then identifies an object in the driver's looking direction out of the detected one or more objects (step S13).

The condition storing unit 434 of the travel controller 4 determines whether the driver's danger avoidance action is detected (step S14). When a danger avoidance action is detected (Yes in step S14), the condition storing unit 434 stores the identified object and a situation condition indicating the situation at detection of the identified object in the memory 42 in association with each other (step S15) and terminates the first travel control process.

When no danger avoidance action is detected (No in step S14), the condition storing unit 434 terminates the first travel control process.

FIG. 7 is a flowchart of a second travel control process. The travel controller 4 repeatedly executes the second travel control process at predetermined intervals (e.g., intervals of ¹⁄₁₀ seconds) during travel of the vehicle 1 under autonomous driving control.

First, the object detection unit 431 of the travel controller 4 detects one or more objects from an environmental image generated by the environmental camera 2 (step S21).

The standard changing unit 436 of the travel controller 4 then determines whether the detected object is an object stored in the situation table 421 in the memory 42 (step S22). When it is determined that the detected object is not an object stored in the situation table 421 (No in step S22), the standard changing unit 436 terminates the second travel control process.

The standard changing unit 436 of the travel controller 4 determines whether the situation at detection of the object satisfies the situation condition (step S23). When it is determined that the situation at detection of the object does not satisfy the situation condition (No in step S23), the standard changing unit 436 terminates the second travel control process.

When it is determined that the situation at detection of the object satisfies the situation condition (Yes in step S23), the standard changing unit 436 changes the predetermined safety standard so that the driver can feel safer (step S24) and terminates the second travel control process.

By executing the first and second travel control processes in this way, the travel controller 4 can control travel of a vehicle so that its driver does not feel uneasy.

Note that those skilled in the art can make various changes, substitutions, and modifications without departing from the spirit and scope of the present disclosure.

What is claimed is:

1. A travel controller comprising:
  a processor configured to:
    detect one or more objects from an environmental image representing surroundings of a vehicle capable of traveling under autonomous driving control satisfying a predetermined safety standard;
    detect a looking direction of a driver of the vehicle from a face image representing a face region of the driver;
    identify an object in the looking direction of the driver out of the one or more objects;
    store the identified object and a situation condition indicating a situation at detection of the identified object in a memory in association with each other when a danger avoidance action performed by the driver to avoid danger is detected during travel of the vehicle;
    change the predetermined safety standard, in the case where an object stored in the memory is detected during travel of the vehicle under the autonomous driving control and where a situation at detection of the object satisfies the situation condition;
    make a learned situation condition, based on a plurality of situation conditions stored at different times in association with the object stored in the memory, the learned situation condition indicating a situation in which the danger avoidance action is detected at detection of the object;

at changing the predetermined safety standard, determine that the situation at detection of the object satisfies the situation condition, when the situation at detection of the object satisfies the learned situation condition;

at storing the identified object and the situation condition, store a rate at which the danger avoidance action is detected in the case where the situation at detection of the object during travel of the vehicle satisfies the situation condition;

at making the learned situation condition, make the learned situation condition so that the situation condition corresponding to a higher rate of detection of the danger avoidance action has priority over the situation condition corresponding to a lower rate of detection of the danger avoidance action; and control a speed or a position of the vehicle under the autonomous driving control based on the changed predetermined safety standard.

2. The travel controller according to claim 1, wherein the situation condition includes at least a distance from the vehicle to the identified object.

3. The travel controller according to claim 1, wherein the processor is configured to control the vehicle under the autonomous driving control based on the changed predetermined safety standard by lowering the speed of the vehicle.

4. The travel controller according to claim 1, wherein the processor is configured to control the vehicle under the autonomous driving control based on the changed predetermined safety standard by lengthening a distance to the object.

5. A method for travel control, comprising:

detecting one or more objects from an environmental image representing surroundings of a vehicle capable of traveling under autonomous driving control satisfying a predetermined safety standard;

detecting a looking direction of a driver of the vehicle from a face image representing a face region of the driver;

identifying an object in the looking direction of the driver out of the one or more objects;

storing the identified object and a situation condition indicating a situation at detection of the identified object in a memory in association with each other when a danger avoidance action performed by the driver to avoid danger is detected during travel of the vehicle;

changing the predetermined safety standard, when an object stored in the memory is detected during travel of the vehicle under the autonomous driving control and when a situation at detection of the object satisfies the situation condition;

making a learned situation condition, based on a plurality of situation conditions stored at different times in association with the object stored in the memory, the learned situation condition indicating a situation in which the danger avoidance action is detected at detection of the object;

at changing the predetermined safety standard, determining that the situation at detection of the object satisfies the situation condition, when the situation at detection of the object satisfies the learned situation condition;

at storing the identified object and the situation condition, storing a rate at which the danger avoidance action is detected when the situation at detection of the object during travel of the vehicle satisfies the situation condition;

at making the learned situation condition, making the learned situation condition so that the situation condition corresponding to a higher rate of detection of the danger avoidance action has priority over the situation condition corresponding to a lower rate of detection of the danger avoidance action; and controlling a speed or a position of the vehicle under the autonomous driving control based on the changed predetermined safety standard.

6. The method for travel control according to claim 5, further comprising controlling the vehicle under the autonomous driving control based on the changed predetermined safety standard by lowering the speed of the vehicle.

7. The method for travel control according to claim 5, further comprising controlling the vehicle under the autonomous driving control based on the changed predetermined safety standard by lengthening a distance to the object.

* * * * *